United States Patent
Siebring

[11] 3,885,686
[45] May 27, 1975

[54] POWER LIFTING ATTACHMENT FOR VEHICLES

[75] Inventor: Barton G. Siebring, Grand Rapids, Mich.

[73] Assignee: Simon M. Oppenhuizen, Grand Rapids, Mich.

[22] Filed: Jan. 11, 1973

[21] Appl. No.: 322,765

[52] U.S. Cl. .............................. 214/77 R; 214/75 R
[51] Int. Cl.² .......................................... B60P 1/48
[58] Field of Search .......... 214/77 R, 75 G, 75 H, 214/DIG. 10

[56] References Cited
UNITED STATES PATENTS

| | | | |
|---|---|---|---|
| 2,567,178 | 9/1951 | Bird | 214/77 R |
| 2,660,319 | 11/1953 | Dorland | 214/77 R |
| 2,683,545 | 7/1954 | Wood | 214/DIG. 10 |
| 2,734,645 | 2/1956 | Petersen | 214/77 P |
| 2,911,118 | 11/1959 | Tapp | 214/77 R |
| 2,928,560 | 3/1960 | Wilkin | 214/75 H |
| 3,258,139 | 6/1966 | Ridgeway | 214/77 P |
| 3,276,610 | 10/1966 | Thatcher | 214/77 R |
| 3,341,038 | 9/1967 | Wicklund | 214/77 R X |
| 3,547,284 | 12/1970 | Dunbar | 214/77 R |
| 3,613,918 | 10/1971 | Kruschke | 214/75 H |

Primary Examiner—Robert J. Spar
Assistant Examiner—Kenneth Noland
Attorney, Agent, or Firm—McGarry & Waters

[57] ABSTRACT

A lifting and loading apparatus to be used in connection with vehicles, for example pickup trucks, to load heavy articles into the same. The apparatus has a pair of tracks which are mounted on a vehicle. A pair of carriages are mounted on the tracks for movement with respect thereto. Power lifting arms are pivotably mounted on the carriage and rigidly support at outer ends a platform or other similar lifting means so that the platform or other means maintains a predetermined relationship with respect to the horizontal during lifting operations. A reversible direct current motor operates the lifting arms through a screw rod. Means are provided to control the motor to selectively turn the motor off and on and also to stop the motor upon the arms reaching a predetermined height or meeting a predetermined resistance during downward descent. The carriages are moved along the tracks by a hand-operated winch which locks the carriages in selective positions along the rails. Special cord holding means are provided to keep the electrical cord for the motor taut as the carriage moves along the tracks. Means are provided for locking the arms in selective positions.

16 Claims, 11 Drawing Figures

PATENTED MAY 27 1975                  3,885,686

SHEET 2

PATENTED MAY 27 1975　　　　　　　　　　　　3,885,686

SHEET　　　3

POWER LIFTING ATTACHMENT FOR VEHICLES

BACKGROUND OF THE INVENTION

1. Field of the Invention

This invention relates to lifting and loading apparatus for vehicles. In one of its aspects, the invention relates to a vehicle mounted apparatus for lifting articles. In another of its aspects, the invention relates to an apparatus for lifting and translating loads into the back of vehicles.

2. State of the Prior Art

Small load carrying vehicles, such as pickup trucks and the like, have been more popular in recent years with the advent of recreational vehicles and home equipment such as lawn tractors and the like. Difficulty has been encountered in getting the load into the back of the truck. For this purpose, ramps have been devised as, for example, in the U.S. Pat. to Wilson No. 3 352 440. However, such ramps may be slippery or may damage vehicles such as snowmobiles while attempting to drive them up or down the ramp. Further, it is sometimes difficult to move heavy loads up or down the ramps.

SUMMARY OF THE INVENTION

According to the invention there is provided a power lifting aparatus for vehicles such as pickup trucks and the like. The lifting apparatus comprises first and second tracks and means for mounting the tracks on the vehicle. First and second carriages are mounted on the first and second tracks respectively for movement therealong. First and second lifting arms are pivotably mounted in the carriages. Power means are provided for rotating in unison the first and second lifting arms about their pivotable mountings whereby the end of the arms can be raised and lowered in selected positions along the track for raising, lowering and transferring articles into the vehicle.

The carriages are rigidly connected together so that they move in unison along the tracks. Means are provided for moving the carriages along the tracks and for locking the carriages in selected positions along the track. Means are also provided for locking the arms in selected raised positions.

In one embodiment, a platform is rigidly supported on the ends of the arms to be raised therewith so that the load, positioned on the platform can be raised and moved into the bed of the truck. Means are provided on the lifting arms to control the position of the platform so that it maintains a rigidly level position regardless of the angular position of the arms which support it and regardless of the degree of unbalanced loads on the platfrom.

Preferably, a direct current electric motor is used to drive the raising and lowering of the lifting arms mounted on the carriages. Means are provided for selectively operating the electric motor so that the arms can be stopped in any angular position with respect to the carriages. Further, means are provided for automatically stopping the motor when the arms have been raised to a predetermined height, and means are provided for automatically stopping the motor when a predetermined resistive force is encountered by the arms as they move downwardly.

BRIEF DESCRIPTION OF THE DRAWINGS

The invention will now be described with reference to the accompanying drawings in which:

FIG. 6 is a side elevational view in section of one of the side assemblies as viewed from inside the truck;

FIG. 10 is a partial sectional view of a braking mechanism for the lifting arms;

FIG. 11 is an enlarged partial view in section of the mechanism for locking the carriages.

DESCRIPTION OF THE PREFERRED EMBODIMENT

Figure 1:
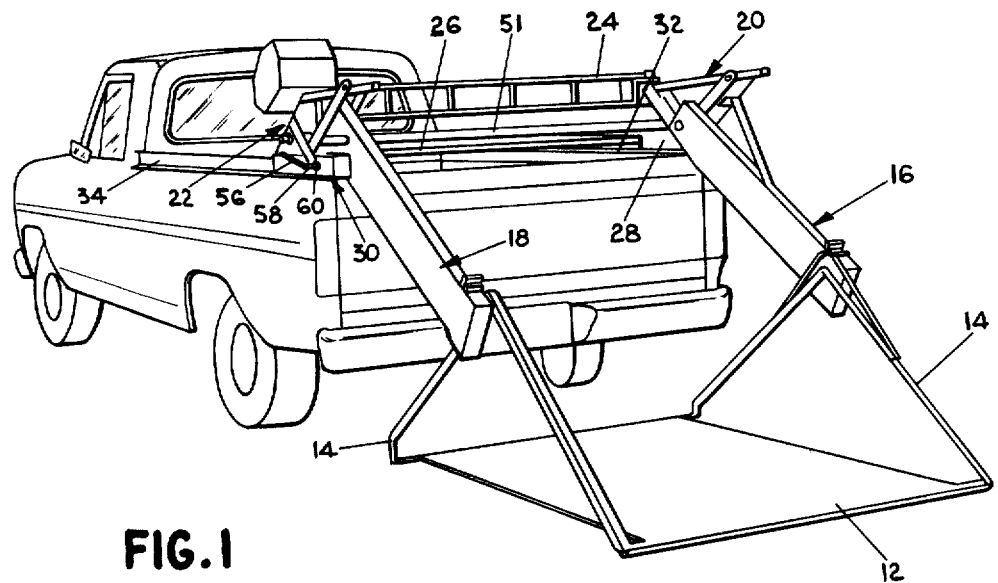
FIG. 1 is a perspective view of a power lifting and transfer apparatus according to the invention as mounted on the back of a pickup truck.

Referring now to the drawings, and to FIG. 1 in particular, there is shown a lifting and transfer mechanism for lifting articles, for example, from a ground level, and transferring the articles to the bed of a pickup truck 10. The mechanism is particularly designed for pickup trucks although, as will be obvious from the following description, the mechanism can be used in any type of vehicle or any other environment in which a relatively heavy load must be lifted, transferred, and lowered into a position.

The lifting mechanism includes a support platform 12 having rigidly secured at side portions thereof upstanding side braces 14. A pair of lift arms 16 and 18 are secured at their outer ends to the upstanding side braces 14 and at their inner ends are pivotably mounted to carriages 28 and 30. Lift mechanisms 20 and 22 are mounted on the carriages 28 and 30, respectively, and power the lift arms 16 and 18 to raise and lower the platform 12. A chain guard 24 extends between the lifting mechanisms 20 and 22. The guard 24 braces the drive mechanisms 20 and 22 with respect to each other. Further, a rigid brace 26 is secured to each of the carriages 28 and 30 to prevent any tipping of the carriage and to provide proper wheel contact on the tracks. A drive rod 51 also extends between the carriages 28 and 30. The carriages 28 and 30 are supported for movement on tracks 32 and 34.

Figure 2:
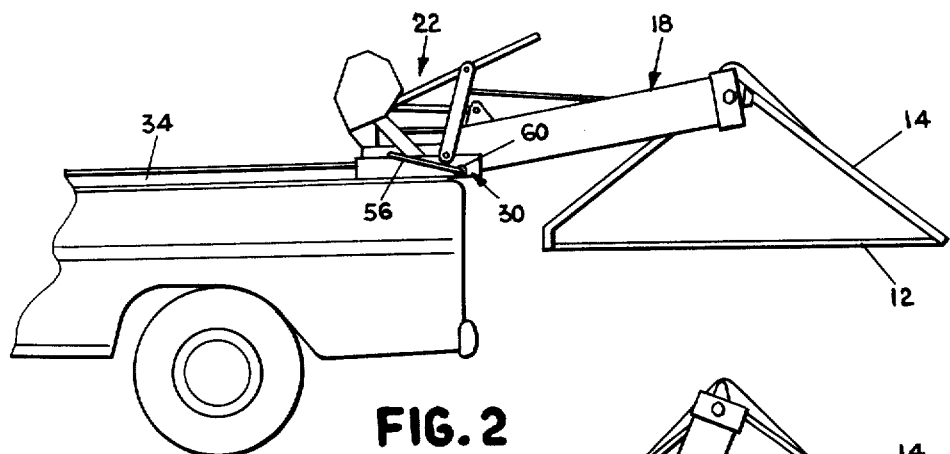
FIG. 2 is a side elevational view of the lifting mechanism showing the lifting platform in a first stage of lifting.
Figure 3:
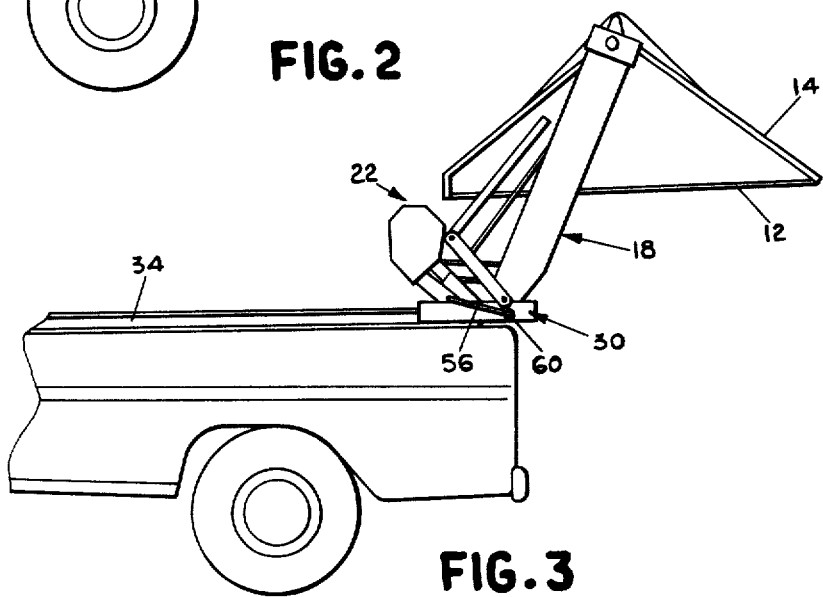
FIG. 3 is a view similar to FIG. 2 showing the hoist in its uppermost position.
Figure 4:
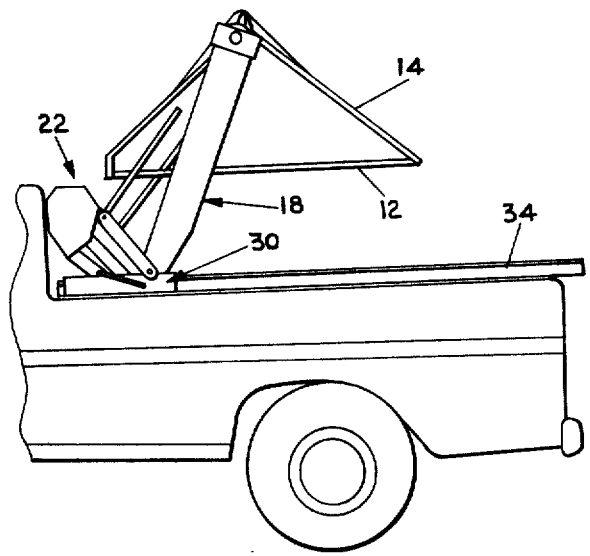
FIG. 4 is a view like FIG. 3 showing the hoist at the uppermost position, but also showing the carriage at a front portion of the truck.
Figure 5:
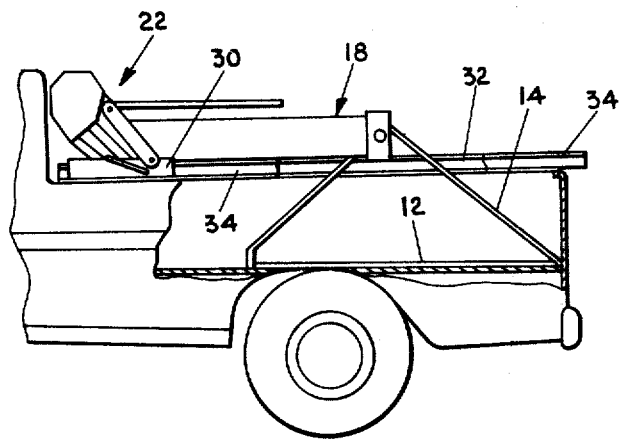
FIG. 5 is a view like FIG. 4 but partly broken away to show the lifting platform positioned in the bed of a truck.

Reference is now made to FIGS. 2-5 for a general description of the operation of the lifting and transfer apparatus. Initially, the arms 16 and 18 are raised in unison by the lifting mechanisms 20 and 22, respectively, to raise the platform from the ground as illustrated in FIG. 2. During the lifting, the support platform 12 is rigidly maintained in a level or horizontal position by a special mounting (which will be described later) of the side braces 14 on the lift arms 16 and 18. The lifting mechanisms 20 and 22 can be stopped at any point to rigidly hold the platform in any position. However, generally the lifting mechanisms raise the arms so that the support platform 12 is positioned above the end of the tailgate of the vehicle. The lift mechanisms can lift the support platform 12 to a position illustrated in FIG. 3. Thereafter, the carriages are rolled to the front of the truck bed with the assistance of a crank handle 56 and a mechanism (not shown in FIGS. 2–5) which will be described later. The forwardmost positions of the support platform 12 and the carriages 28 and 30 are illustrated in FIG. 4. The lifting mechanisms 20 and 22 are then actuated once again to lower the support platform 12 into the bed of the truck as illustrated in FIG. 5.

The lifting and support mechanisms will now be described in more detail with reference to FIGS. 6–9. In these figures one side of the lifting and transfer mechanism will be described. It is to be understood that the other side of the mechanism is substantially identical with the exception of the drive motor and, for purposes of brevity, only one such side will be discussed in detail.

Figure 8:
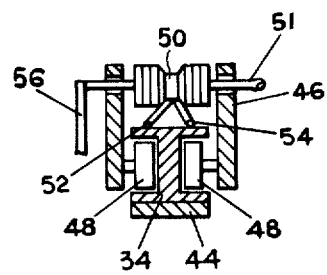
FIG. 8 is a partial view taken along lines 8—8 of FIG. 6.
Figures 6, 10, 11:
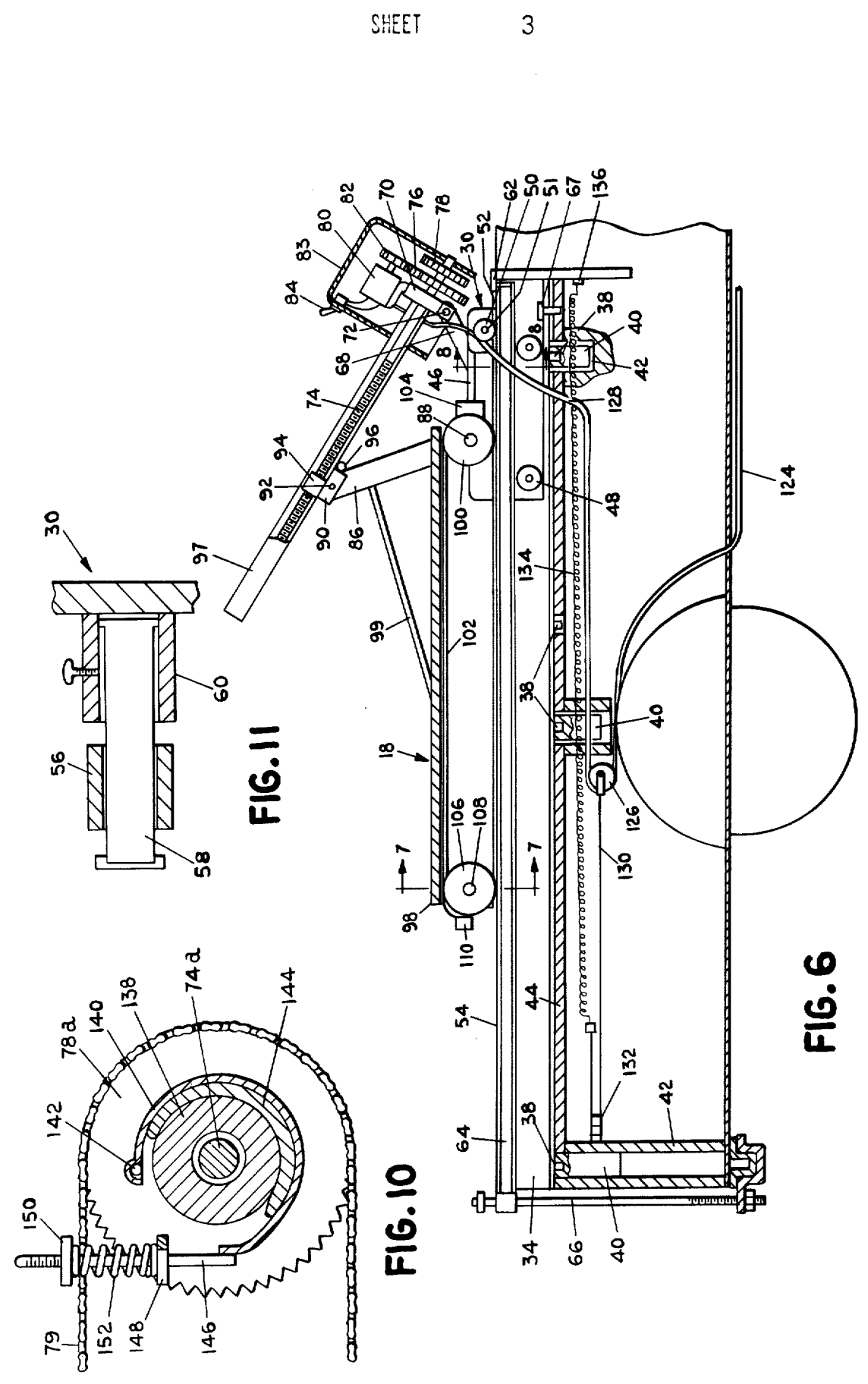

The carriage 30 comprises a U-shaped housing 46 rotatably mounting a plurality of wheels 48 which ride on an I beam shaped track 34 (FIG. 8). The carriage 30 also rotatably mounts a drum 50 which winds a pair of cables 52 and 54. A handle 56 is secured to the drum and extends to the outside of the housing 46 for winding the drum 50. The handle 56 has an inwardly extending end portion 58 which can be selectively positioned and locked in a socket 60 (FIGS. 2–5). When the drum 50 is being wound by the handle 56, the end 58 of the handle 56 is disengaged from the socket 60 so that it can rotate freely thereabout. To this end, the end 58 is axially slidable in the handle 56 so that it may be positioned in and removed from the socket 60 (FIG. 11). When the end 58 is positioned in the socket 60, the handle is locked in the position illustrated in FIG. 5 and the carriages 28 and 30 are locked in place on the tracks 32 and 34.

Cable 52 extends forwardly along the top of track 34 and is secured at fastener 62 to the front portion thereof. In the same fashion, the cable 54 extends rearwardly along the top of the track 34 and is secured at a rear portion thereof to a fastener 64. As illustrated in FIG. 6, a bolt 66 is provided at the rear portion of the track 34 to bolt the track to the truck and to limit the movement of the carriage 30 in a backward direction on the track 34. The forward movement of the carriage 30 on track 34 is limited by bolt 67 on track 34. A similar bolt 66 can be provided at the forward end of the track for improved anchoring.

The carriage 30 is thus movable on the track 34 by winding of the crank hangle 56 in one direction or the other. As the carriage is moved to the back of the track 34, the drum 50 unwinds the cable 52 and simultaneously winds the cable 54. In moving the other direction, the cable 52 is wound by drum 50 whereas the cable 54 is simultaneously unwound. The drive rod 51, driven by handle 56 winds a similar drum and cable arrangement on the carriage 28 so that the carriages 28 and 30 move in unison. Further, locking of the handle end 58 in the socket 60 locks the carriage 28 as well as the carriage 30 in selected positions along the tracks 32 and 34.

The lifting mechanism 22 comprises a pair of arms 68 (only one of which is shown in FIG. 6) extending rearwardly at an angle from the carriage 30. A block 70 is pivotably mounted at a top portion of the arms 68 through a shaft 72. A threaded rod 74 is journaled in the block 70 having, at one end thereof, gears 76 and 78 with the gear 76 abutting the block 70. A motor 80 is mounted on the block 70 and drives an output gear 82 which in turn drives gear 76 and threaded rod 74. A chain 79 engages the sprocket gear 78 and extends to the opposite side of the lifting mechanism on the chain guide 24 (FIG. 1), to drive a threaded rod 74a through a sprocket gear 78a(FIG. 10 mounted on carriage 28. A casing 83 encloses the motor for protection and mounts a switch 84 used to operate the motor.

A pivotable arm 86 is pivotably mounted at a bottom portion on journal 88 in the U-shaped carriage housing 46. At its upper end, arm 86 pivotably mounts a block 90 through pivot pin 92. A ball bearing nut 94 is secured to the block 90 and threadably engages an upper portion of the threaded rod 74 to form a ball screw assembly. A spring 96 projects from a lower portion of the block 90 for a purpose which will be described later. A U-shaped cover 97 abuts block 70 at a lower portion and extends along the length of rod 74 to protect the same from the elements. At its upper portion, the cover 97 slides in block 90. A brace 99 extends rigidly between lift arm 18 and pivotable arm 86.

Figure 7:
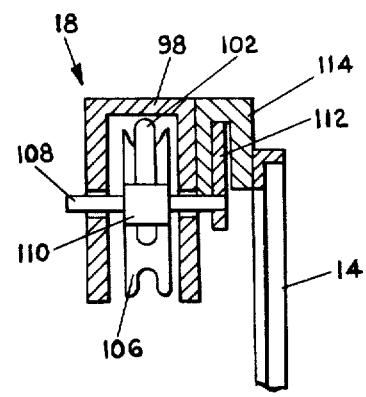
FIG. 7 is a partial sectional view taken along lines 7—7 of FIG. 6.

The lift arm 18 has a hollow casing 98 which is pivotably mounted at a forward end to housing 46 of carriage 30 through journal 88. A pulley 100 is rigidly mounted to the carriage housing 46 and guides a cable 102 over the upper surface thereof. A fastener 104 is secured to the carriage housing 46 and clamps the forward end of the cable 102. At the back portion of the arm 18, a pulley 106 is mounted on pivot shaft 108 which is journaled in the casing 98. A fastener 110 clamps the forward end of the cable 102 to the pulley 106. As illustrated in FIG. 7, an upright lug 112 is securely fastened to the inner end of the shaft 108 so that it moves therewith and with the pulley 106. A receptacle 114 snugly fits over the upstanding lug 112 and is securely retained thereby. The side brace 14 is secured by welding at its upper portion to the receptacle 114.

As the casing 98 of arm 18 rotates about the journal 88, the forward end of cable 102 will remain fixed as the pulley 100 rotates with the arm 18. However, as the arm 18 rotates, the pulley 106 is free to rotate with respect to the casing 98 but its rotational movement is restricted by cable 102. Thus, the pulley 106 will undergo a counterclockwise rotation with respect to the casing 98 as the casing 98 rotates about journal 88. However, the pulley 106 does not rotate with respect to the horizontal so that the lug 112 maintains its vertical orientation regardless of the angular position of the arm 18. In this manner, the support platform 12 is held rigidly horizontal during the raising and lowering thereof by the lift arms 16 and 18.

Figure 9:
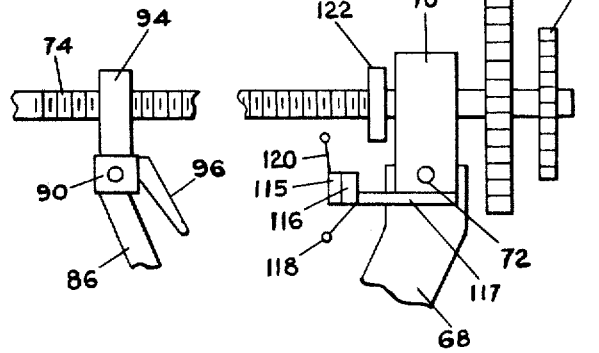
FIG. 9 is an enlarged view of a portion of the mechanism illustrated in FIG. 6 showing the means for controlling the stopping of the motor in its uppermost position and in its lowered positions.

Reference is now made to FIG. 9 which shows the manner in which the motor is stopped when the lift arms reach their uppermost position, or when the downward movement of the lift arms is arrested, such as when the support platform 12 comes to rest at the bed of the pickup truck or comes to rest on the ground. A pair of micro switches 115 and 116 are mounted on the block 70 through a brace 117. A switch actuator 118 extends from beneath the switch 116 and in position to contact the spring 96 on the block 90 when the lift arm 18 is in the uppermost position as, for example, illustrated in FIGS. 3 and 4. Thus, when the lift arms 16 and 18 are in the uppermost position, spring 96 abuts against the actuator 118 to close the switch 116 and thereby stops the motor 80. An actuator 120 is mounted at an upper portion of the micro switch 115 adjacent to a collar 122 which is secured to threaded rod 74. As seen more clearly in FIG. 9, a slight spacing is provided between the gear 76 and the block 70. Further, the threaded rod 74 is axially slidable within the block 70, but the degree of movement therein therein is restrained by the gear 76 at one side and the collar 122 at the other side.

When the support platform 12 has reached the ground or the bed of a truck, the motor will continue to drive the rod 74. However, since the lift arms 16 and 28 cannot move, and the pivot arm 86 is also restrained, the threaded rod 74 will be pulled to the left as viewed in FIG. 9 until such time as the collar 122 contacts the micro switch actuator 120. The actuator 120 actuates a switch 116 which cuts off the flow of current to the motor 80 through conventional leads (not shown).

As seen in FIG. 6, power is supplied to the motor 80 through an electrical cord 124 which extends from a battery (not shown) up through a hole in the floor of the vehicle and is guided about pulley 126 and through a sheath 128 which is secured to the carriage 30. A cable 130 is secured at one end to the pulley 126 and is wound about a pair of pulleys 132 (only one of which is shown in FIG. 6) and is secured at the other end to a long coil tension spring 134. A fastener 136 at the forward end of the truck bed retains the other end of the coil spring 134. The pulley 126 is thus resiliently biased to a back portion of the truck by the cable 130 and the spring 134 to hold the electric cord 124 taut regardless of the position of the carriage 30.

Reference is now made to FIG. 10 which shows a partial sectional view through the threaded rod 74 of the lifting mechanism 20. The gear 78a is secured to the threaded rod 74a and mounts a drum 138 to rotate therewith. A strap 140 partially encircles or wraps the drum 138 and is fixed to a pin 142 at one end. Pin 142 is fixed to the mounting block (not shown) like 70 (FIG. 6) and holds the end of the strap fixed with respect to the drum 140. The other end of the strap 140 is welded to a screw shaft 146 which extends through and is retained by ring 148, also secured to the mounting block (not shown). Brake lining material 144 is positioned between the strap 140 and the drum 138 for braking the rotational movement of drum 138 and hence the shaft 74a. A nut 150 threadably engages the upper end of screw shaft 146 and is tightened against a spring 152. The tension of the brake lining material against the drum 138 is thus adjusted by nut 150 against the tension of spring 152.

As the rod 74a rotates in a clockwise direction as viewed in FIG. 10, the drum tends to draw or wrap the strap 140 tightly into contact with it thus braking or frictionally dragging the roataion of the rod 74a in the clockwise direction. The arms are lowered during this clockwise rotation of rod 74a (and simultaneously of rod 74) and thus a braking is applied as the arms 16 and 18 are lowered.

As the rod 74a is rotated in a counterclockwise direction as viewed in FIG. 10, the action of the drum 138 against the brake lining 144 tends to loosen the strap 140 around the drum 138. Thus, as the arms 16 and 18 are raised, the effect of the brake lining material 144 is minimized.

The screw rods 74, 74a and ball bearing nuts 94 in combination with the braking assembly illustrated in FIG. 10 provide sufficient frictional resistance to retain or lock the arms 16 and 18 in any selected position when motor 80 is turned off. Other means of locking the arms in selected positions can also be used in lieu of the ball shaft assembly of ball shaft 74 and ball bearing nut 94. With such a substitution the braking assembly illustrated in FIG. 10 can be eliminated.

The lifting and transfer mechanism of the invention described above has many uses. Such uses include lifting loads such as small tractors, snowmobiles, farm equipment and the like from the ground and into the bed of the vehicle and vice versa. Additionally, the lifting platform can be used to extend the tailgate for larger loads. For example, the carriages 28 and 30 can be wheeled to a central part of the track 34 so that the platform 12, when lowered, will extend from the bed of the truck with the tailgate lowered. Still further, the lifting platform and side braces can be entirely removed from the lift arms 16 and 18 by simply lifting the same upwardly, and a winch, block-and-tackle or other suitable mechanism can be substituted in place of the support platform 12. The lifting and transfer mechanism can thus be used as a hoist when such a change has been made.

The lifting and transfer mechanism is a versatile and easily operated mechanism which can be easily installed and removed from the bed of a pickup truck or other suitable support. The entire mechanism can be quickly disassembled for removal from the vehicle. The mechanism is strong, can lift heavy loads, and easily transfer the load into a vehicle.

Reasonable variation and modification are possible within the scope of the foregoing disclosure, drawings, and appended claims without departing from the spirit of the invention.

The embodiment of the invention in which an exclusive property or priviledge is claimed are defined as follows:

1. In a power lifting apparatus for vehicles comprising:
   first and second tracks;
   means for mounting said tracks on a vehicle;
   first and second carriages mounted on said first and second tracks respectively for movement therealong;
   first and second lifting arms pivotably mounted on said carriages;
   power means for raising and lowering in unison said first and second lifting arms about their pivotable mountings, whereby the free end of said arms can be raised and lowered in selected positions along said tracks for raising and transferring articles into said vehicle, the improvement which comprises:
   said power means includes a ball screw assembly including a threaded rod, and a ball bearing nut threadably engaging the threaded rod and pivotably mounted to said first lifting arm whereby rotation of the threaded rod causes the ball bearing nut to ride along the threaded rod, the threaded rod being pivotably mounted at one end portion to said first carriage so that rotation of said threaded rod with respect to the ball bearing nut causes raising and lowering of said first lifting arm about its pivotable mounting; motor means mounted on said ball screw assembly for movement therewith; means coupling said motor means to said ball screw assembly for rotating said threaded rod; and braking means for applying substantial braking action to said ball screw assembly during downward movement thereof so as to hold said arm in any one of a number of positions with respect to said carriage and for applying very minimal braking to said ball screw assembly during upward movement thereof, so as to permit lifting of large loads without undue drag from said braking means.

2. A power lifting apparatus according to claim 1 and further comprising means for locking said first and second carriages in selected positions along said first and second tracks.

3. A power lifting apparatus according to claim 2 wherein said locking means includes a winch mounted on one of said carriages and winding two cables in opposite directions, one of said cables being secured at one end of the track mounting said one carriage carriage and the other of said cables being secured to an opposite end of said track mounting said one carriage.

4. A power lifting apparatus according to claim 1 and further comprising means for rigidly joining said first and second carriages together for movement in unison along said tracks.

5. A power lifting apparatus according to claim 1 and further comprising a platform and means for supporting said platform on the free ends of said first and second arms, and further including means for maintaining said platform level as said first and second arms are raised and lowered.

6. A power lifting apparatus according to claim 1 wherein said motor means includes an electric motor and further comprising means for cutting off the flow of current to said electric motor when a predetermined resistance to downward movement is encountered by said lifting arms.

7. A power lifting apparatus according to claim 6 and further comprising means to cut off the flow of electric current to said electric motor responsive to said arm reaching a predetermined upper limit.

8. A power lifting apparatus according to claim 1 wherein said motor means includes an electric motor; and further comprising means to limit the upward movement of said lifting arms responsive to said arms reaching a predetermined upper limit.

9. A power lifting apparatus accordig to claim 1 wherein an electrical cord is electrically coupled to said motor for supplying electrical current thereto; and resilient means maintain said electric cord in taut condition as said carriages move along said tracks.

10. A power lifting apparatus according to claim 4 and further comprising: a second ball screw assembly including a threaded rod mounted on said second carriage between said second carriage and said second lifting arm; and means for driving said threaded rod of said second ball screw assembly synchronously with said first ball screw assembly threaded rod, whereby said first and second arms are driven upwardly and downwardly in unison by said first and second ball screw assemblies.

11. A power lifting apparatus according to claim 10 and further comprising a guard track extending between and connected to said first and second ball screw assemblies, and said driving means includes a chain and gearing on said threaded rods, said chain and drivingly engaging said gearing, so that said ball screw assemblies and said guard track move as a unit.

12. A power lifting apparatus according to claim 1 wherein said braking means comprises: a drum coupled to said threaded rod for rotation therewith; a brake strap at least partially wrapped around said drum, said brake strap being of a material so as to produce a frictional drag when wrapped tightly around said drum; means rigidly mounting one end of said brake strap with respect to said drum; and means resiliently mounting the other end of said brake strap with respect to said drum so that said drum works against the tension of said resilient mounting to unwrap said brake strap when said screw rod rotates so as to raise said first lifting arm and said drum works against said fixed mounting to wrap said brake strap around said drum when said screw rod rotates so as to lower said first lifting arm.

13. A power lifting apparatus according to claim 1 and further comprising protective cover means for covering said threaded rod, said protective cover means mounted on said carriage and slidably mounted with respect to said ball bearing nut.

14. A power lifting apparatus for vehicles comprising in combination:
first and second tracks;
means for mounting said tracks on a vehicle;
first and second carriages mounted on said first and second tracks respectively for movement therealong;
first and second lifting arms each being hollow substantially along the length thereof and pivotably mounted on a horizontal axis on said first and second carriages, respectively in spaced relationship to each other for rotational movement on said carriages;
a platform;
means for supporting said platform on the free ends of said first and second lifting arms; and
means for maintaining said platform level as said lifting arms are rotated about their pivotable mountings on said carriages, said means for maintaining said platform level including a first guide means with a curved upper surface having a center of curvature on the pivotable mounting axis of said first arms, a cable drawn over the curved surface and rigidly coupled to said first guide means, said cable passing through the interior of said hollow arm, a second guide means with a curved upper surface of the curvature to the first guide means curved surface rotatably mounted within the free end of said first lifting arm and secured nonrotatably to said platform supporting means, said cable being drawn over said curved surface of the second guide means and means for rigidly coupling said cable to said second guide means so that said cable is maintained taut as said first lifting arm rotates and so as to maintain said platform support means angularly fixed with respect to said first support means.

15. A power lifting apparatus according to claim 14 and further comprising means to rotate said lifting arms about their respective pivotable mountings.

16. A power lifting apparatus according to claim 14 wherein said cable is coupled to said first support means through a first circular guide surface, said guide means mounted to the free end of said first lifting arm is a second circular guide means of a size equal to said first guide surface, and said cable is coupled to said second circular guide surface.

* * * * *